United States Patent
Hickson (10) Patent No.: US 7,757,119 B2
(45) Date of Patent: Jul. 13, 2010

(54) INHERITED TRANSACTIONS IN ASYNCHRONOUS MESSAGING

(75) Inventor: Andrew Ian Hickson, West Wellow (GB)

(73) Assignee: International Business Machines Corporation, Armonk, NY (US)

( * ) Notice: Subject to any disclaimer, the term of this patent is extended or adjusted under 35 U.S.C. 154(b) by 945 days.

(21) Appl. No.: 11/462,748

(22) Filed: Aug. 7, 2006

(65) Prior Publication Data

US 2007/0038569 A1 Feb. 15, 2007

(30) Foreign Application Priority Data

Aug. 10, 2005 (GB) .................. 0516399.3

(51) Int. Cl.
*G06F 11/00* (2006.01)
(52) U.S. Cl. .................. 714/16; 714/15; 719/313; 719/314
(58) Field of Classification Search .................. 714/16, 714/15; 719/313, 314
See application file for complete search history.

(56) References Cited

U.S. PATENT DOCUMENTS

| | | | |
|---|---|---|---|
| 5,778,179 A * | 7/1998 | Kanai et al. .................. 709/203 |
| 5,878,206 A * | 3/1999 | Chen et al. ..................... 714/19 |
| 6,178,463 B1 * | 1/2001 | Houston et al. ............. 719/315 |
| 6,298,478 B1 * | 10/2001 | Nally et al. .................. 717/170 |
| 6,529,932 B1 * | 3/2003 | Dadiomov et al. .......... 718/101 |
| 7,113,942 B2 * | 9/2006 | Levanoni et al. ................ 707/3 |
| 7,206,805 B1 * | 4/2007 | McLaughlin, Jr. .......... 709/203 |
| 2003/0220968 A1 | 11/2003 | Hickson et al. |
| 2004/0088712 A1 | 5/2004 | Hickson et al. |
| 2004/0240444 A1 * | 12/2004 | Matthews et al. ............ 370/389 |

* cited by examiner

*Primary Examiner*—Philip Guyton
(74) *Attorney, Agent, or Firm*—Marcia L. Doubet (57) ABSTRACT

A method and system of inherited transactions in an asynchronous messaging are provided. A producer requests a message put operation in a transaction. A consumer carries out a get operation with the option to inherit the transaction of the put operation. In an inherited transaction, the consumer's transaction will not commit until the transaction it has inherited from commits. Work performed in the producer's transaction is visible to the consumer, but work performed in the consumer's transaction is not visible to the producer preserving asynchronous messaging semantics. A transaction hierarchy results and only the net effect of transaction hierarchy is hardened to non-volatile storage.

20 Claims, 7 Drawing Sheets

INHERITED TRANSACTIONS IN ASYNCHRONOUS MESSAGING

FIELD OF THE INVENTION

This invention relates to the field of messaging and, in particular, it relates to inherited transactions in asynchronous messaging.

BACKGROUND OF THE INVENTION

The asynchronous transfer of messages between application programs running in different data processing systems within a network is well known in the art, and is implemented by a number of commercially available messaging systems. These systems include IBM Corporation's WebSphere MQ family of messaging products, which use asynchronous messaging via queues. A sender application program issues a put message command to send a message to a target queue, and a WebSphere MQ queue manager program handles the complexities of transferring the message from the sender to the target queue, which may be remotely located across a heterogeneous computer network. The target queue is a local input queue for another application program, which retrieves the message from this input queue by issuing a get message command asynchronously from the send operation. The receiver application program then performs its processing on the message, and may generate further messages.(IBM, WebSphere and MQ are trademarks of International Business Machines Corporation in the United States, other countries, or both.)

Messaging can be persistent or non-persistent. In non-persistent messaging there is no assurance that the message will be delivered. In persistent messaging there is an assurance of delivery and, in one technique, this is achieved by storing the message (often referred to as "hardening") to non-volatile memory (e.g. a disk storage device) as part of the messaging process. This means that if the messaging system fails during the message transfer then the message can be recovered. Although persistent messaging prevents loss of messages, there is a significant overhead involved in hardening to disk.

Messaging can be transactional or non-transactional. Transaction processing is a well known technique and in general terms involves the execution of discrete units of work that access and update shared data. Logical points of consistency at which resource changes are synchronized within transaction execution are called commit points or syncpoints. An application ends a unit of work by declaring a syncpoint or by the application terminating. The characteristic of a transaction being accomplished as a whole or not at all is known as 'atomicity'. Atomicity of a transaction is known to be achieved by resource updates made within the transaction being held uncommitted until a syncpoint is declared at completion of the transaction. That is, the resource updates are only made permanent and visible to applications other than the one which performed the updates on successful completion. If the transaction fails to complete successfully, then all changes that have been made to resources during the partial execution are removed. The transaction is said to rollback (or backout) and the resources are restored to the consistent state which existed before the transaction began. Any party (e.g. an application or resource manager) with an interest in the unit of work can cause a rollback when a syncpoint is declared by indicating unreadiness to commit.

In one example of transactional processing as applied to persistent messaging, a message is put inside a syncpoint and, when committed, is hardened to disk. A number of messages may advantageously be batched inside a single syncpoint and hardened to disk as a batch thus improving the efficiency of the operation.

A particular form of messaging is the publish/subscribe architecture where a publisher application may put a message to a plurality of subscriber applications. The model enables the publisher and subscriber to be independent and unaware of the nature of each other.

A problem encountered in transactional messaging of persistent messages is the performance overhead of hardening transactions to disk. In some circumstances in high integrity transactional systems, the input/output overhead can degrade the performance of the system.

In non-transactional messaging, it is known to reduce hardening to disk of a persistent message by avoiding queuing.

An aim of the present invention is to provide a method that allows a set of interacting transactions to commit efficiently by trading off transaction independence (failure isolation and serialization) against performance.

In an environment where a producer and consumer are both available, then using inherited transactions communication is synchronous. If the consumer is unavailable then communication is asynchronous. In both cases the producer and consumer are largely unaware of the existence of the synchronous path (i.e. the asynchronous programming model is followed). Inherited transactions can reduce the input/output overhead in a highly serialized messaging environment.

In the field of distributed messaging, the coordination of transactions by external syncpoint managers use an industry-standard XA interface defined by an X/Open Group CAE Specification—Distributed Transaction Processing. An XA syncpoint coordinator can manage a set of XA resource managers and synchronise commit or backout of transactions in both resource managers.

The XA interface includes XA suspend/resume protocols, and at an XA level the problem of the number of forced inputs/outputs might be addressed by suspending and resuming the transaction.

However, there are a number of reasons why the XA capabilities are not used to resolve the problem, including the following:

1. Although the number of forced inputs/outputs is reduced there is still a considerable overhead in putting the publish request on the stream queue and then getting it off again.
2. The transaction isolation model would not give the correct message visibility. All activity would occur in a single transaction and it would not be possible to distinguish between a message being passed from the producer to the consumer and a message being passed in the other direction.
3. The internal overheads in XA transaction management are considerable.

With the inherited transactions, there is no loss of transactional integrity. Either all of the activities associated with the producer's message will complete or none of them will complete. However, there is a potential loss of independence between the participating components. For example, if a subscriber decides to backout the transaction, then it isn't always clear whether the publisher is made aware of this fact.

A key feature of asynchronous messaging is that, by its nature, it decouples the operations of the participating components to provide transaction independence. This provides independence between message producers and consumers. If the operations are nested in a single inherited transaction, there is a risk that this transaction independence may be lost.

If the activities in an inherited transaction are completely serial, then it is trivial for the queue manager to intercept a negative vote for commit and take appropriate compensating action thus hiding this activity from the other participants and continuing to provide a reasonably high degree of transparency of the inherited transaction capability. However, a strictly serial execution has performance costs.

A further aim of the present invention is to provide inherited transactions in persistent asynchronous messaging while maintaining participating application isolation. Performance is balanced with independence of the participants by optionally allowing the participants of the transaction to execute in parallel.

SUMMARY OF THE INVENTION

According to a first aspect of the present invention there is provided a method of performing inherited transactions in an asynchronous messaging system. A producer requests a message put operation in a transaction. A consumer carries out a get operation with the option to inherit the transaction of the put operation. The consumer's transaction will not commit until the transaction it has inherited from commits and work performed in the producer's transaction is visible to the consumer while work performed in the consumer's transaction is not visible to the producer, preserving asynchronous messaging semantics.

A transaction hierarchy results and, preferably, only the net effect of transaction hierarchy is hardened to non-volatile storage. Preferably, message persistence is maintained by hardening to non-volatile storage when all transactions in the transaction hierarchy agree to commit, or rolling back all the transactions if one or more transaction in the transaction hierarchy is not able to commit.

The inherited transactions may be processed synchronously. The option of the get operation to inherit the transaction of the put operation may result in the consumer explicitly agreeing to read an uncommitted message. A received message may be indicated as received in an inherited transaction.

The put operation may have the option for a message to be either synchronously inheritable, in which case there is full transparent compensation in the event the consumer rolls back, or asynchronously inheritable, in which case no compensation is available and the error is detected at commit time.

The get operation may be a waiting get operation and may be available when the put operation is requested. Alternatively, the get operation may not be available when the put operation is requested but may leave an inactive waiter block and the put operation may wait for the get operation. In this case, the producer may provide a waiting representation of a put operation request and the get operation may receive the message associated with the put operation when the get operation occurs.

According to a second aspect of the present invention there is provided an asynchronous messaging system, comprising: a producer application requesting a message put operation in a transaction; a consumer application carrying out a get operation with the option to inherit the transaction of the put operation; wherein, in an inherited transaction, the consumer's transaction will not commit until the transaction it has inherited from commits; and wherein work performed in the producer's transaction is visible within the transaction context associated with the consumer application, but work performed in the consumer's transaction is not visible within the transaction context associated with the producer application preserving asynchronous messaging semantics.

A get operation command may include an input option to indicate the consumer application is willing to receive messages in an inherited transaction. A put operation command may include an input option indicating that the producer application does not need to know the outcome of the put operation at the time the put operation is issued.

Each session is capable of looking through its own transaction history and the transaction history of all direct ancestors in the transaction hierarchy.

According to a third aspect of the present invention there is provided a computer program product comprising computer readable program code stored on a computer readable storage medium for performing the steps of: a producer requesting a message put operation in a transaction; a consumer carrying out a get operation with the option to inherit the transaction of the put operation; wherein, in an inherited transaction, the consumer's transaction will not commit until the transaction it has inherited from commits; and wherein work performed in the producer's transaction is visible to the consumer, but work performed in the consumer's transaction is not visible to the producer preserving asynchronous messaging semantics.

BRIEF DESCRIPTION OF THE DRAWINGS

Embodiments of the present invention will now be described, by way of examples only, with reference to the accompanying drawings in which.

DETAILED DESCRIPTION

Applications running on different computers or nodes within a network are able to communicate using messages and queuing. Communication by messaging and queuing enables applications to communicate across a network without having a private, dedicated, logical connection to link them. Communication is by putting messages on message queues and taking messages from message queues. Each node in a network has a queue manager. The queue managers interface to applications through a message queue interface that is invoked by the applications. The message queue interface supports many different operating system platforms.

Figure 1:
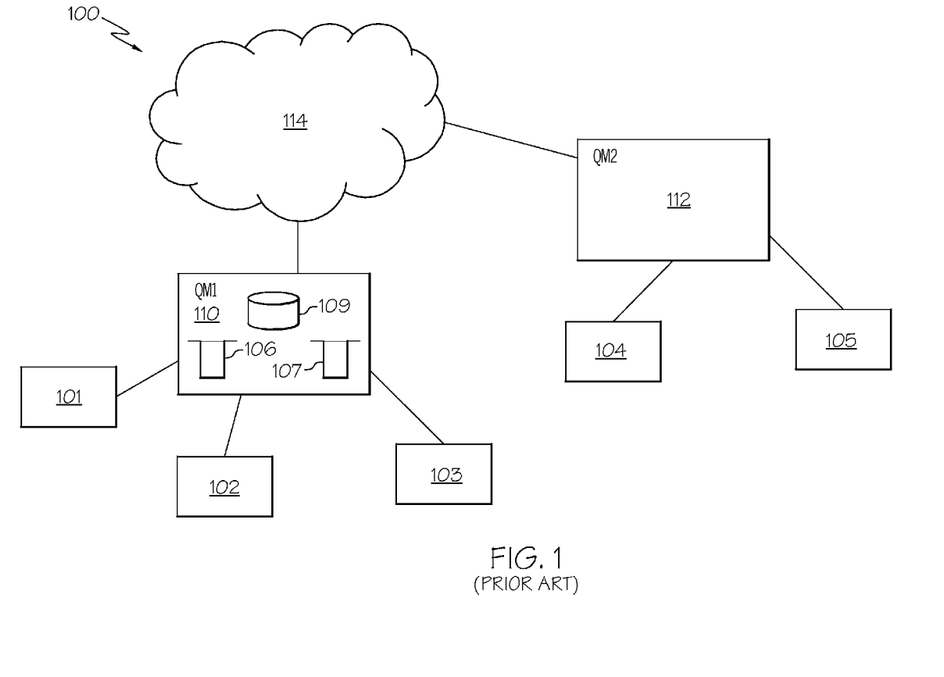
FIG. 1 is a block diagram of a messaging system as known in the art.

Referring to FIG. 1, a simple messaging system 100 is shown. Queue managers 110, 112 are system programs that provide queuing services to client applications 101-105. Queue managers 110, 112 communicate with each other via a network 114 to send and receive messages to client applications 101-105 connected to the same or other queue managers.

As a general overview, a client application 101 puts a message to an input queue 106 at its local queue manager 110. A service application gets the message off the input queue 106, processes it, and puts a message to an output queue 107 for retrieval by the same or another client application 101-105. The input queue 106 and the output queue 107 may not be located at the second queue manager. For example, the output queue may be located at the second queue manager 112 in FIG. 1 for retrieval by applications 104 or 105.

In known high integrity persistent messaging, at every change to a queue, the changes need to be saved to a log 109 in a log force operation in order to guarantee the data integrity in the event of a failure. This can be processor and time consuming and may be detrimental to the performance efficiency of the messaging system 100.

One form of messaging architecture is the publish/subscribe model. Messaging system middleware matches publications to subscribers and handles the delivery of the messages. Messaging middleware can use various architectures including a message broker or network of message brokers. In a message broker architecture, the client applications in the form of publisher and/or subscriber applications are connected to a message broker which handles the communication between the client applications. The message broker coordinates the distribution of messages. It provides the routing of the messages and is responsible for the delivery of messages and the authentication and authorisation of users. This form of architecture allows a publisher client application to send a message to multiple subscriber client applications while only requiring a connection to the message broker.

Figure 2:
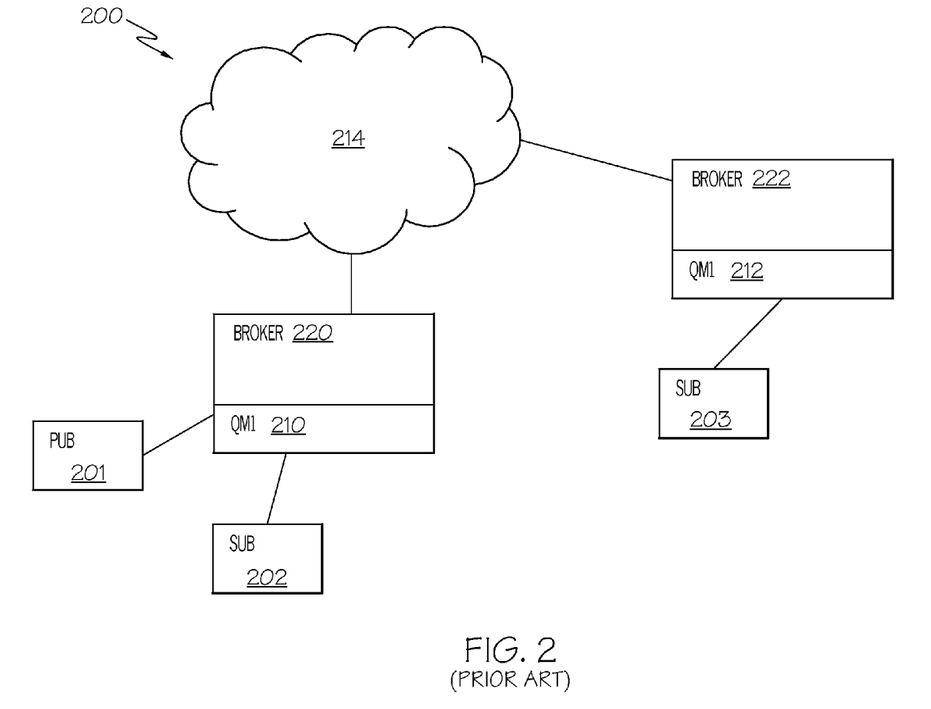
FIG. 2 is a block diagram of a publish/subscribe messaging system as known in the art.

FIG. 2 shows a publish/subscribe messaging system 200. A publisher application 201 may publish a message by putting in to the broker 220. The broker's queue manager 210 may put the message on the input queues of subscribers 202, 203 to the topic of the message. As depicted in FIG. 2, a subscriber 203 can be distributed across a network 214 and connected to a local queue manager 212 and broker 222.

An embodiment of the present invention is described in which a messaging system is provided that enables inherited transactions in asynchronous persistent messaging. The terms producer and consumer are used for client applications which put and get messages respectively. A single application may be a producer and a consumer. The terms producer and consumer include publisher and subscriber applications in a publish/subscribe messaging system as well as non-publish/subscribe applications.

In an example embodiment, the feature of inherited transactions is accessible by public options on put, get and commit commands.

1. Get Operation

This operation allows a get option structure to be passed to the GET. This allows some additional capabilities including (among others):

GETOPT_INHERIT option—This is an input field indicating that the getting application is willing to receive messages inside inherited transactions.

INHERITED field—This is an output field indicating if the message returned is part of an inherited transaction.

2. Put Operation

This operation allows a put options structure to be passed to the PUT. This allows some additional options including:

PUTOPTS_ASYNC option—This is an input option indicating that the caller does not need to know the outcome of the put at the time the put was issued. That is, processing related to the put can occur after control has returned to the application that issued the put.

3. SyncPoint Operation

This commit operation allows a syncpoint structure to be passed to commit. This allows some additional options including:

SYNCPT_ASYNC_COMMIT option—This is an input option indicating that the caller wishes to mark a unit of work boundary, but that the caller does not need to know the outcome of the transaction.

In inherited transactions the broker uses this option when committing an inherited transaction, indicating that when a producer commits then the broker has completed its part, but that the broker does not need to know if the producer commits or rolls back the unit of work.

Figure 3A:
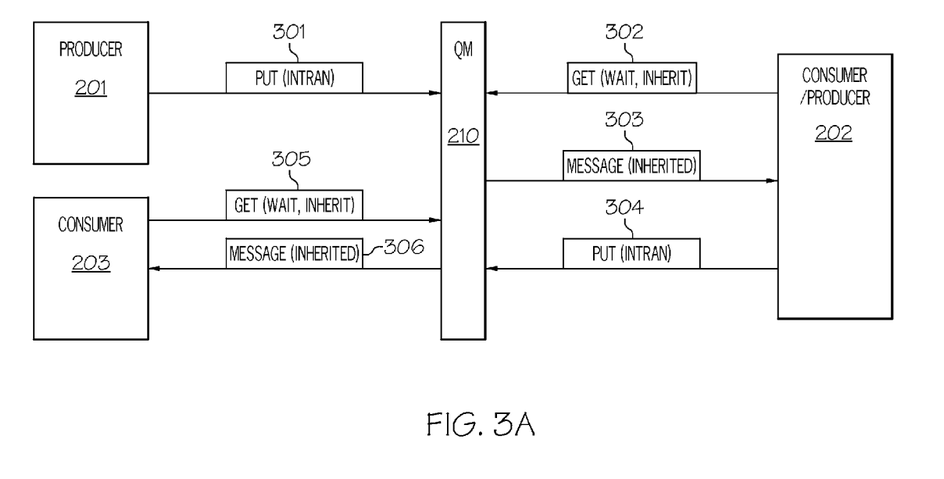
FIG. 3 is a message flow diagram in accordance with the present invention.

Referring to FIG. 3A, a message flow is shown between three client applications 201-203 and a queue manager 210 such as those illustrated in FIG. 2. The internal processes of the queue manager 210 are not shown.

The first application 201 is a producer and puts 301 a transactional message to the queue manager 210. The second application 202 is a consumer and has a waiting get operation 302 at the queue manager 210 indicating an option that it is willing to receive a message inside an inherited transaction. The message is returned 303 to the second application 202 with an output field indicating that the message is returned as part of the inherited transaction. In this way, the second application 202 has accepted that it is receiving uncommitted data and this choice is exposed externally.

The second application 202 then acts as a producer and puts 304 the message or a resultant message to a third application 203 via the queue manager 210. The third application 203 is a consumer and has a waiting get operation 305 also indicating an option that it is willing to receive the message inside an inherited transaction. The message is returned 306 to the third application 203 with an output field indicating that the message is returned as part of the inherited transaction.

An option for a producer application 201, 202 is provided to explicitly select whether synchronous inheritance or asynchronous inheritance occurs. In synchronous inheritance, there is full transparent compensation in the event the consumer application should backout. In asynchronous inheritance, no compensation occurs and errors are only detected at commit time.

In the optimal case, the inherited transaction model path is faster than the normal path. In the local case, then the inherited transaction model should be at least an order of magnitude faster than traditional store and forward. However, implementation requires a waiting get to be available at the instant the put is issued. As soon as one put occurs that does not find a waiting get, then the put will have to queue the message, including forcing a log record. Once the producer has written a log record then the consumer will also have to force a log record, and the consumer's forced log record must occur in a subsequent input/output from the producer, thus reducing the chance of the next put finding a waiting get.

A solution to this problem is the concept of a waiting put. Get operations able to participate in inherited transactions are flagged, and when the get returns the waiter block is left in the chain of waiters, but is flagged as inactive. When a put sees an inactive waiter block then it can tell that there is a high chance that a waiting get will be available in an instant. Instead of writing a persistent message, the producer writes a special sort of non-persistent message that is only visible to inherited transaction capable gets. If this non-persistent message is not collected by an appropriate get in the next few milliseconds then the non-persistent message is destroyed and a persistent message is put on the queue.

Figure 3B:
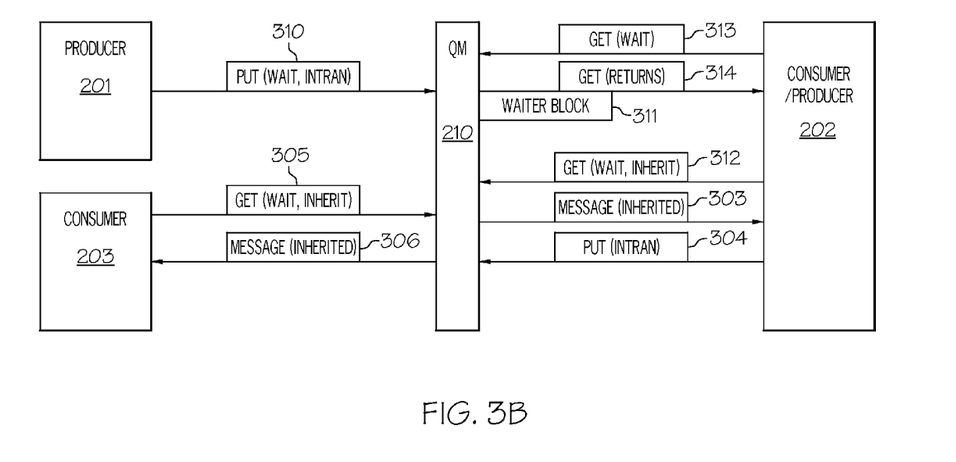

This is illustrated in FIG. 3B which shows the same scenario as FIG. 3A with the first application 201 making a put request 310 which waits. The second application has a previous get 313 which has returned 314 and a waiter block 311 is left by the previous get marked as inactive. The waiter block 311 indicates to a put 310 that a waiting get 312 is likely to be available shortly. The transactions then proceed as in FIG. 3A.

The use of inherited transactions in the messaging system bridges the gap between synchronous and asynchronous communications. The producers and consumers must use the asynchronous programming style, but when all parties are available then the queue manager effects synchronous communications between the producer and consumer. In order for this to be possible, the work performed in the producer's transaction must be visible to the consumer, but work done in the consumer's transaction must not be visible to the producer.

In asynchronous messaging, a classic mistake, as shown below, is for a requesting application to put a message and expect to receive the reply in the same unit of work. This is only possible with synchronous interaction.

```
PUT + PMO_SYNCPOINT    /* Put a request message  */
GET + GMO_SYNCPOINT    /* Get the reply          */
CMIT                   /* Commit the transaction */
```

In a traditional transaction model, the request message would not be made visible to the consumer, and thus no reply would ever be generated and the get would wait forever.

In the proposed inherited transaction model, the request message is made available to the consumer application which generates a reply message. If this reply message was in turn presented to the producer application then the asynchronous programming semantics would be lost completely and the program would function differently depending upon whether the consumer application was available or not. It is a strong requirement of inherited transactions that the same basic programming model is presented and so this case needs to be catered for.

Figure 4A:
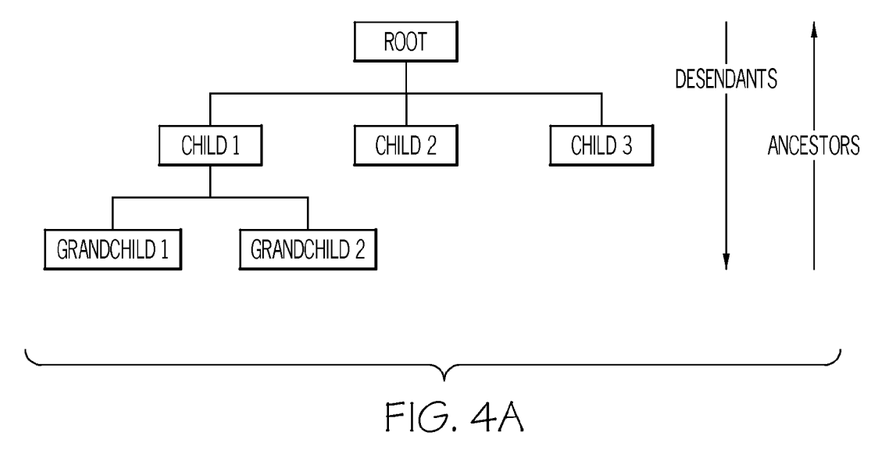
FIGS. 4A to 4C are example hierarchy structures in accordance with the present invention.

Every transaction hierarchy has a single "root" transaction. The root transaction can have one or more "child" transactions, each of those child transactions can have zero or more grandchild transactions, and so on. This basic hierarchy is shown in FIG. 4A.

The Transaction Control Block structure (hereafter referred to as TCB) is modified to allow the transaction hierarchy to be constructed. Each TCB contains three fields, "Parent", "FirstChild" and "Sibling" for this purpose.

The transaction hierarchy must be well constructed, for example, it would be invalid for a loop to exist in the hierarchy.

Figure 4B:
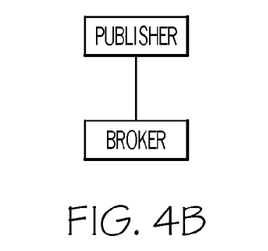

In the most simple 1<<1 inherited transaction involving a publisher and a broker then the hierarchy would be as shown in FIG. 4B, where:
  publisher.FirstChild=broker
  broker.Parent=publisher and all other hierarchy related fields would be null.

Figure 4C:
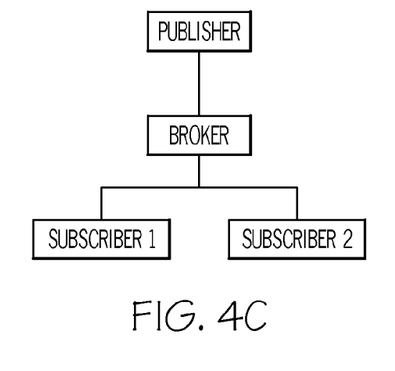

In the case of end to end 1<<2 publish subscribe then the hierarchy-might be as shown in FIG. 4C.

It is now easy to see what messages were produced in each transaction, and it is possible to make messages produced in the publisher visible to the broker, and not to make messages produced by the broker visible to the publisher (thus preserving asynchronous messaging semantics).

Figure 5:
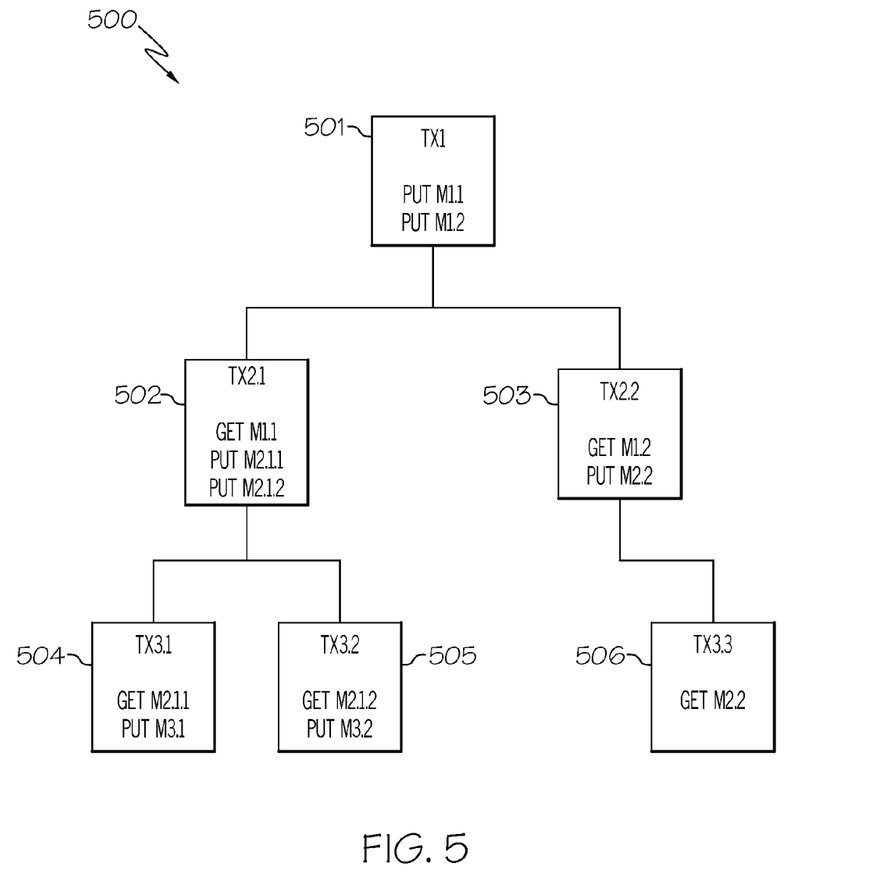
FIG. 5 is a schematic diagram of a transaction hierarchy in accordance with the present invention.

Referring to FIG. 5, a transactional hierarchy 500 is shown in which a root node in a transaction hierarchy is a first transaction TX1 carried out by a first application 501 which puts messages M1.1, M1.2 consumed by second and third applications 502, 503 which get the messages M1.1, M1.2 in transactions TX2.1, TX2.2. The second application 502 further puts messages M2.1.1, M2.1.2 consumed by fourth and fifth applications 504, 505. The fourth and fifth applications 504, 505 get the messages M2.1.1, M2.1.2 and put messages M3.1, M3.2 in transactions TX3.1, TX3.2 respectively. The third application 503 puts message M2.2 consumed by a sixth application 506 which gets the message M2.2 in transaction TX3.3. It should be noted that the applications do not need to be distinct, for example, the fourth application 504 could be the same as the first application 501.

Each application at a node of the transaction hierarchy 500 when getting a message elects to participate in the inherited transaction. Each application when putting a message selects whether the put is asynchronous (concurrent) or synchronous (serialized).

In this described embodiment, the root transaction may be a two phase transaction, but any other transaction in the hierarchy must be a one phase transaction. Also, the child transaction may not be managed by a different transaction coordinator than the parent transaction. For example, in order for a child to run on a different physical machine, the child would have to pull the message (e.g. using the MQSeries client interface) and allow the same queue manager to manage both the parent and the child transactions. This eliminates any significant consideration related to resolving indoubt transactions.

An important point is that a message put by a transaction in a hierarchy is not visible to direct ancestors of the putting transaction. It is visible to any other transaction in the hierarchy which is not a direct ancestor.

In the case of persistent messages, only the net effect of the entire transaction in the hierarchy needs to be hardened. For example, if the root transaction does a put and a child does a get, then the net effect is null and no data needs to be hardened.

A transaction history of transactions is maintained by transactions in the form of a log of the sequence of operations including control information but excluding the data itself. The record avoids the need to read to the hard log record for operation information.

Transaction isolation is desired when using inherited transactions. Known transaction isolation models allow a get to see an in transaction put request that was put in the same transaction. When a get comes across an in transaction put during the message search algorithm, it scans the transaction history of the current transaction to see if the put and the get were issued in the same transaction, and therefore if the message should be visible to the get. In an example embodiment of the proposed method, this capability is extended by allowing the get to look through its own transaction history, and the transaction histories of all direct ancestors.

Considering the hierarchy of FIG. 5, where
  TX1 puts M1.1 and M1.2
  TX2.1 gets M1.1 and puts M2.1.1 and M2.1.2
  TX2.2 gets M1.2 and puts M2.2
  TX3.1 gets M2.1.1 and puts M3.1
  TX3.2 gets M2.1.2 and puts M3.2
  TX3.3 gets M2.2

Then M1.1 and M1.2 are visible to all transactions in the hierarchy
  M2.1.1 and M2.1.2 are visible to TX2.1, TX3.1, TX3.2
  M3.1 is visible only to TX3.1
  M3.2 is visible only to TX3.2

The locking scheme described below is sufficient to allow transactions to scan the transaction histories of any other transaction in the hierarchy, but this described implementation chooses to only scan the transaction histories of direct ancestors.

Figure 6:
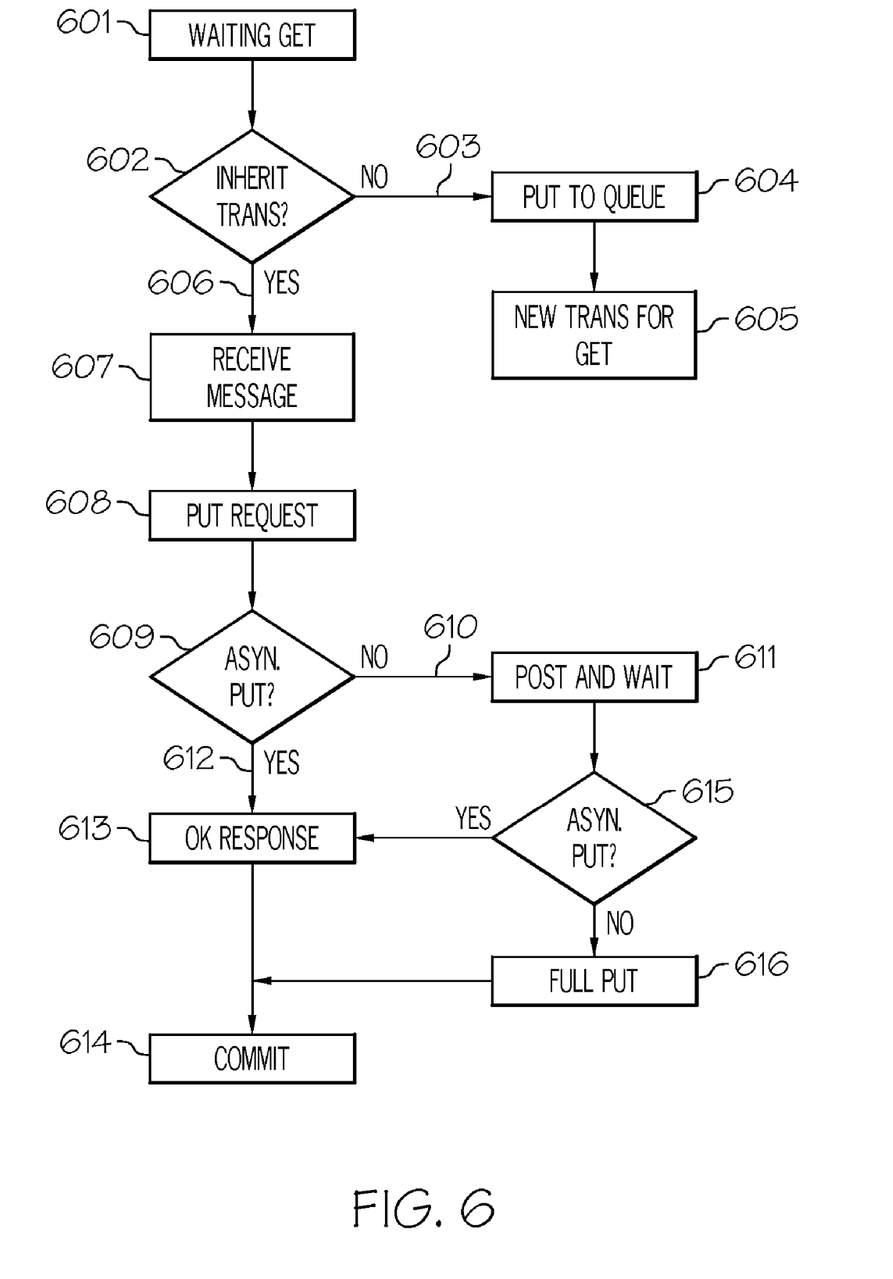
FIG. 6 is a flow diagram of operations at a node of the transaction hierarchy of FIG. 5.

A flow diagram of the method carried out at the node of the third application 503 of FIG. 5 is shown in FIG. 6. The application has a waiting get operation 601 and has the option to inherit the transaction 602.

If the application selects not to inherit the transaction 603, the message is put 604 to the target queue and the get operation 605 is carried out under a new transaction.

If the application selects to inherit the transaction 606, the message is received 607. The application put the message 608 consumed by the sixth application 506 and selects 609 whether or not it is synchronously or asynchronously inheritable.

If synchronously inheritable 610, a serialized post is made and the application waits 611. It is determined 615 if the put is a success and, if so, the process returns an OK response 613. If not, a full put operation 616 is carried out.

If asynchronously inheritable 612, the operation is put asynchronously and an OK response 613 is returned. In due course the inherited from transaction commits 614.

When an inherited transaction hierarchy commits, the root node must wait for all the children nodes to vote to commit and, if OK, the entire hierarchy is committed.

In a simplistic strictly-serialized synchronous implementation, the locking implications are minor as only a single relation in the hierarchy is ever active at one point in time. However, in the more complicated asynchronous case where the execution of the various relations overlaps then there are more significant locking concerns.

The primary purpose of the asynchronous case is to allow concurrent activity to let the network delays overlap. There is no need for the queue operations to overlap as they are fast enough to be allowed to execute serially. Thus a scheme is implemented which allows any one of the transactions to be active at any one point in time. This is controlled by using the transaction data mutual exclusion (mutex) of the root transaction. For a relation in a transaction hierarchy to update its transaction state then it must own both its own transaction data mutex and the transaction data mutex of the root transaction in the hierarchy. The classic deadlock problems associated with multiple locks are avoided by only allowing transactions to wait for transaction data mutices of descendent transactions.

There is also the problem of identifying the root transaction, which is not static due to the possibility of a transaction adopting a parent.

The root transaction can be located by scanning through the "Parent" chain to avoid deadlocking.

The model requires a transaction hierarchy to be able to atomically commit. In an example implementation, the commit has two distinct paths, one for inherited transactions and the other for singleton transactions. The inherited transaction path needs to repeatedly take the same action for every transaction in the hierarchy and this is achieved through recursive calls. The maximum recursion level corresponds to the depth of hierarchy.

1. Locking the Hierarchy

At commit time then all of the transactions in the hierarchy are updated and so must own the transaction data mutices of all these transactions. The commit is always under the root transaction and so it is easy to avoid deadlock by locking the transactions from top to bottom and from left to right.

2. Waiting for All Relations in the Transaction Hierarchy to Vote

During commit, the process must wait for all relations in the hierarchy to vote. Rather than locking the entire hierarchy, then checking if everyone has voted, and if not unlocking the entire hierarchy, the process checks if transactions have voted as the hierarchy is locked. Release all locks that have already been obtained before waiting.

3. Atomic Commit Point

The actual commit looks very like several concurrent commits in the trace, however only a single log record is written which includes multiple transaction identifiers, one for each transaction in the hierarchy which has hardened message updates. Many transaction hierarchies will contain significant numbers of transactions which performed no logging.

During transaction initialization each transaction reserved sufficient log space to guarantee that the transaction would be able to log its commit/rollback log record.

The size of the multiple commit log record is guaranteed to be smaller than the size of the equivalent combined log records. During commit processing then the log space reserved by the descendent transactions is transferred to the root transaction.

4. Processing the Transaction History

Each transaction's transaction history is processed in turn. This is likely to be considerably less efficient than performing a single scan of a combined transaction history, however in the most performance-sensitive cases the transaction history is expected to be small.

5. Transaction Rollback

Although commit processing always occurs under the root transaction in the hierarchy, rollback processing can occur under any transaction in the hierarchy. When a transaction in the hierarchy initiates rollback processing then that transaction and all its descendants are rolled back immediately. However, the TCB's are not removed from the overall transaction hierarchy and remain as zombies until the root transaction completes. Note that in the case of rollback there is no need to wait for the descendent transactions to vote.

The inherited transaction model extends the reach of queue avoidance to include transactional puts and gets, but only in the case where the transaction performing the put is able to adopt the transaction performing the get. As messaging (vs queuing) is able to be used, rather than combine a put and a get into the same transaction, both the put and the get are avoided.

The inherited transaction model avoids the put and get by passing the message from the put to the get without touching the queue. In the case of a waiting put then the message is passed from the put to the get via a non-persistent message.

In the case where all of the puts and gets cancel out and the net effect is null, commit processing will recognize this case and perform an appropriately efficient commit.

In an example embodiment of an implementation, a broker is extended to exploit inherited transactions. The basic changes involve only setting any extra options used to get messages off the stream queue and to put messages on a subscriber queue, and to commit each publish operation.

Previously, the sequence of messages processed by the broker could be guaranteed to be committed in the intuitive order. However when the broker takes some action as part of an inherited transaction then that work gets committed when the root transaction (typically the publisher) commits.

Thus the order in which actions are committed may differ from the order in which the activities occurred (multiple publishers).

Inherited transactions enable competitive benchmarks to be demonstrated in the area of highly serialized persistent publish subscribe.

Some of the described embodiments are given in the field of publish/subscribe messaging. However, if will be appreciated that the described model may equally be applied to other messaging architectures.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

The invention claimed is:

1. A computer-implemented method of performing inherited transactions in an asynchronous messaging system, comprising:
    at a computer of a consumer, executing code for carrying out a get operation with an option to inherit a transaction in which a producer has requested a message put operation, wherein the option of the get operation to inherit the transaction of the put operation results in the consumer explicitly agreeing to read an uncommitted message;
    wherein, in an inherited transaction, the consumer's transaction will not commit until the transaction it has inherited from has committed; and
    wherein work performed in the producer's transaction is visible to the consumer while work performed in the consumer's transaction is not visible to the producer.

2. A method as claimed in claim 1, wherein a transaction hierarchy results and only a net effect of the transaction hierarchy is hardened to non-volatile storage.

3. A method as claimed in claim 2, wherein message persistence is maintained by hardening to non-volatile storage when all transactions in the transaction hierarchy agree to commit, or rolling back all the transactions if one or more transactions in the transaction hierarchy is not able to commit.

4. A method as claimed in any one of claims 1-3, wherein the inherited transactions are processed synchronously.

5. A method as claimed in claim 3, wherein a received message is indicated as received in an inherited transaction.

6. A method as claimed in claim 3, wherein the put operation has the option for the message to be synchronously inheritable providing full transparent compensation if the consumer rolls back, or asynchronously inheritable providing no compensation is available and an error is detected at commit time.

7. A method as claimed in claim 3, wherein the get operation is a waiting get operation and is available when the put operation is requested.

8. A method as claimed in claim 6, wherein the get operation is not available when the put operation is requested but leaves an inactive waiter block and the put operation waits for the get operation.

9. A method as claimed in claim 8, wherein the producer provides a waiting representation of a put operation request and the get operation receives the message associated with the waiting put operation when the get operation occurs.

10. An asynchronous messaging system, comprising:
    a computer comprising a processor; and
    instructions which are executable on the computer, using the processor, to perform:
        at a consumer application, carrying out a get operation with an option to inherit a transaction in which a producer application has requested a message put operation, wherein the put operation has the option for the message to be synchronously inheritable providing full transparent compensation if the consumer application rolls back, or asynchronously inheritable in which case no compensation is available and an error is detected at commit time;
        wherein, in an inherited transaction, the consumer's transaction will not commit until the transaction it has inherited from commits; and
        wherein work performed in the producer's transaction is visible within a transaction context associated with the consumer application, but work performed in the consumer's transaction is not visible within a transaction context associated with the producer application.

11. A system as claimed in claim 10, wherein a transaction hierarchy results and only a net effect of the transaction hierarchy is hardened to non-volatile storage.

12. A system as claimed in claim 11, wherein message persistence is maintained by hardening to non-volatile storage when all transactions in the transaction hierarchy agree to commit, or rolling back all the transactions if one or more transaction in the transaction hierarchy is not able to commit.

13. A system as claimed in any one of claims 10 to 12, wherein the inherited transactions are processed synchronously and the producer and consumer applications are unaware of the synchronous processing.

14. A system as claimed in claim 12, wherein the option of the get operation to inherit the transaction of the put operation results in the consumer application explicitly agreeing to read an uncommitted message.

15. A system as claimed in claim 12, wherein a received message is indicated as received in an inherited transaction.

16. A system as claimed in claim 12, wherein the get operation is a waiting get operation and is available when the put operation is requested.

17. A system as claimed in claim 10, wherein the get operation is not available when the put operation is requested but leaves an inactive waiter block and the put operation waits for the get operation.

18. A system as claimed in claim 17, wherein the producer application provides a waiting representation of a put operation request and the get operation receives the message associated with the put operation when the get operation occurs.

19. A computer program product stored on a computer readable storage medium, comprising computer readable program code for enabling a computer executing said program code to perform:
    at a consumer, carrying out a get operation with an option to inherit a transaction in which a producer has requested a message put operation;
    wherein, in an inherited transaction, the consumer's transaction will not commit until the transaction it has inherited from commits;
    wherein the get operation is not available when the put operation is requested but leaves an inactive waiter block and the put operation waits for the get operation; and
    wherein work performed in the producer's transaction is visible to the consumer while work performed in the consumer's transaction is not visible to the producer.

20. A computer-implemented method of performing inherited transactions in an asynchronous messaging system, comprising:
  at a consumer computer, executing code for carrying out a get operation with an option to inherit a transaction in which a producer has requested a message put operation;
  wherein, in an inherited transaction, the consumer's transaction will not commit until the transaction it has inherited from commits;
  wherein the get operation is not available when the put operation is requested but leaves an inactive waiter block and the put operation waits for the get operation; and
  wherein work performed in the producer's transaction is visible to the consumer while work performed in the consumer's transaction is not visible to the producer.

* * * * *